May 24, 1927.

G. W. BOOKSH

EXPANSION PISTON

Filed Oct. 20, 1926

Inventor
George W. Booksh
By L. N. Gullies
Attorney

Inventor
George W. Booksh
By L. N. Gillis
Attorney

Patented May 24, 1927.

1,629,988

UNITED STATES PATENT OFFICE.

GEORGE W. BOOKSH, OF GROSSE TETE, LOUISIANA.

EXPANSION PISTON.

Application filed October 20, 1926. Serial No. 142,937.

This invention relates to pistons for engines such as internal combustion motors and has special reference to an expansible piston.

One important object of the invention is to provide an improved form of piston capable of being expanded so as to take up any wear which may occur either in the piston or the cylinder in which it moves.

A second important object of the invention is to provide a novel form of piston which may be expanded so as to fit its cylinder to such closeness that the rings, common to pistons, are rendered unnecessary and may be eliminated.

A third important object of the invention is to so arrange the parts of such a piston that the expansion is effected with substantially no distortion of the cross section of the piston from a true circle.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
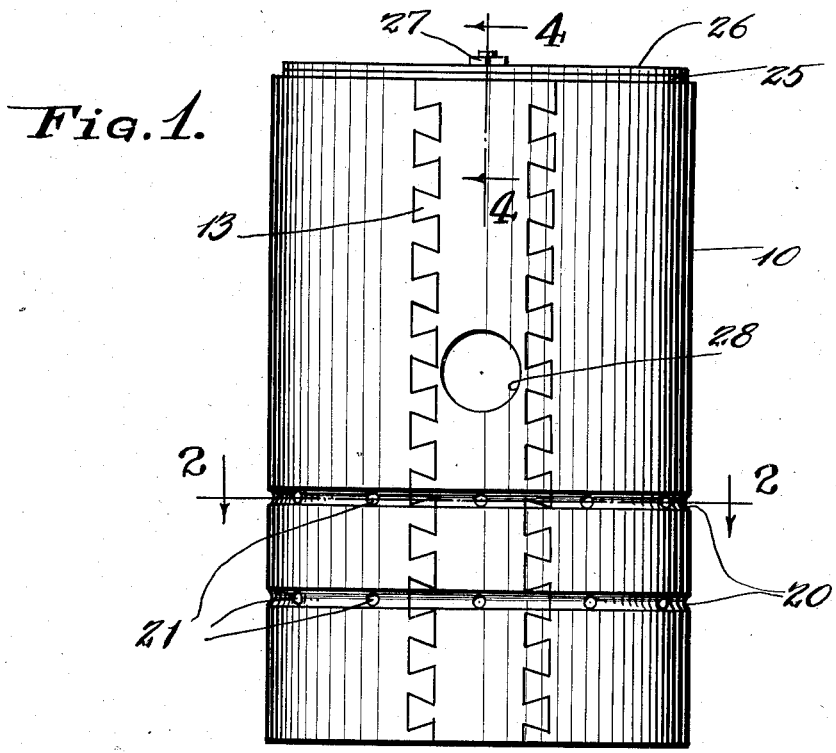
Figure 1 is a side elevation of a piston constructed in accordance with this invention.
Figure 2:
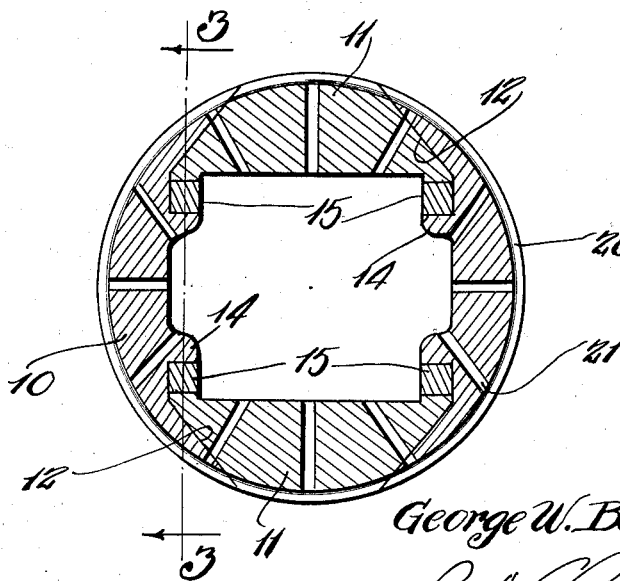
Figure 2 is a section on the line 2—2 of Figure 1.
Figure 3:
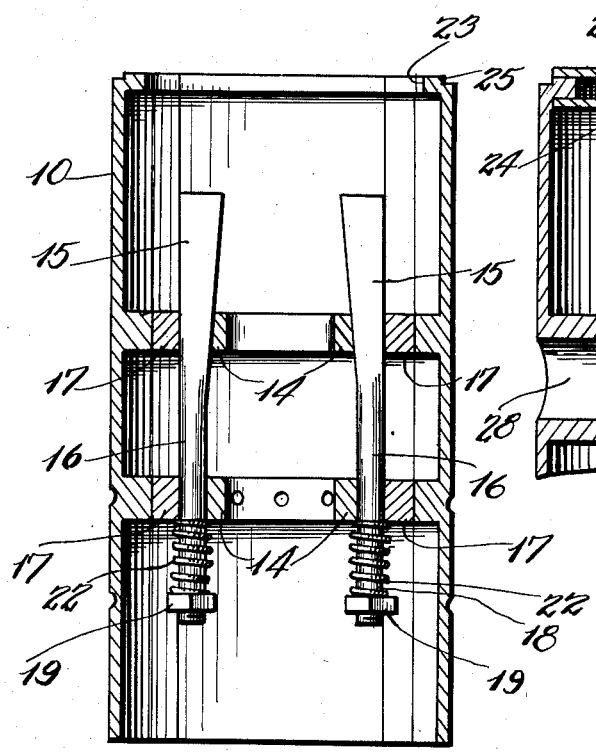
Figure 3 is a section on the line 3—3 of Figure 2.
Figure 4:
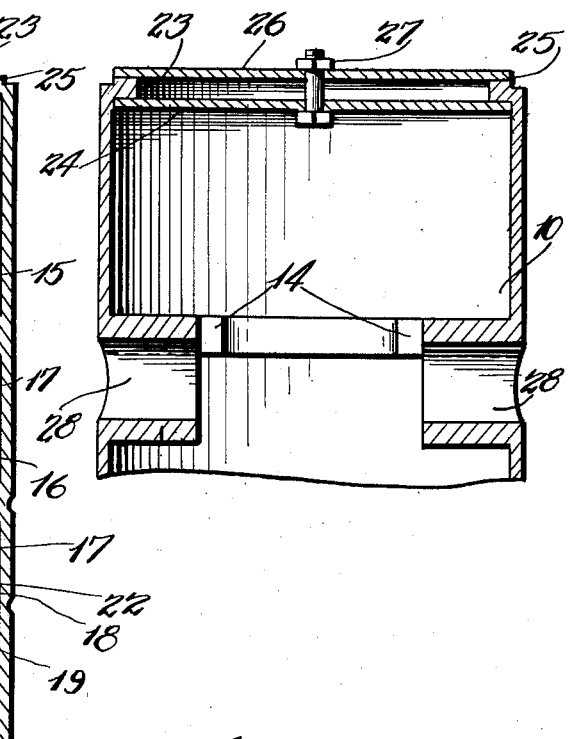
Figure 4 is a detail section on the line 4—4 of Figure 1.
Figure 6:
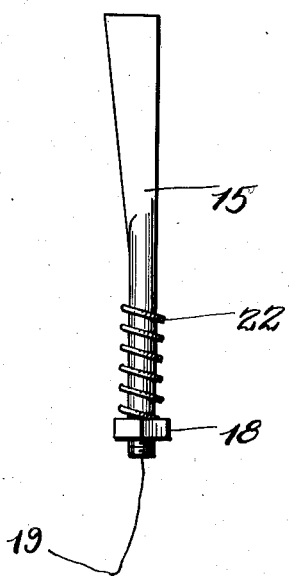
Figure 6 is a detail view of one of the tapered bolts used herewith.
Figure 5:
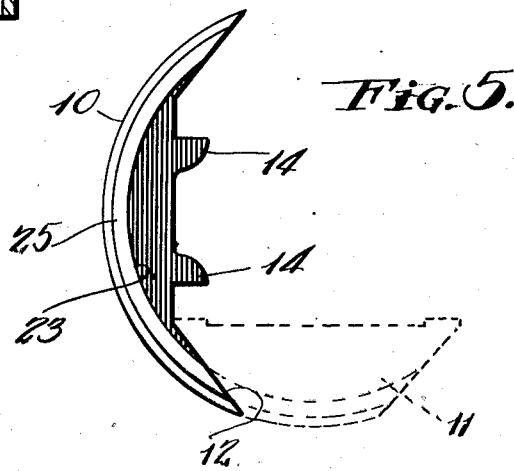
Figure 5 is a section through one of the side walls showing the dovetail lugs.

This invention includes a pair of what are preferably termed side walls 10 and a pair of wedge members 11 which fit between the inclined inner surfaces 12 of the side walls. These parts are held together by dovetails 13. About centrally of the length of the piston on each side wall is a pair of lugs 14 which are spaced from the edges of the wedge walls 11 and between these lugs and the edges of said wedge walls are mounted tapered bolts 15 which terminate at the open end of the piston in a shank 16 each passing through a lug 17 carried on a respective side wall. The lower end of each shank is threaded as at 18 and on this threaded end is screwed a nut 19 which bears against the underside of the lug 17 so that, by screwing up upon the nuts the wedges are drawn down and the wedge walls 11 forced outwardly. Due to the dovetailing and to the fact that the side walls are thinner toward their ends than at the middle the outward movement of the wedge walls 11 forces the ends of the side walls further apart and thus expands the piston in a substantially circular form. Obviously loosening the nuts 19 and moving the wedges 15 upward permits these side walls to contract and force the wedge walls inwardly. It is to be noted that the curved portion of each wedge wall is relatively narrow so that the principal bearing of the piston in the cylinder is on the side walls. Near the bottom of the cylinder is provided a pair of oil grooves 20 having perforations 21 extending through the side and wedge walls so that the oil in excess between the piston and cylinder may run back into the hollow cylinder and drop into the crank case. It will be observed that between the nut 19 and lug 17 there is provided a spring 22 on each wedge so that proper tension can be maintained on the wedges. The upper ends of the side and wedge walls are provided with internal flange portions 23 beneath which is engaged a plate 24 and, on top of these side and wedge walls is formed an annular boss or ring 25 whereon rests a plate 26. A bolt and nut 27 serves to hold these two plates together and the plates thus form the end closure for the piston. Obviously the bolt must not be clamped so tightly as to interfere with the action of the wedges while at the same time it must be clamped tightly enough to cause the plates to fit closely on the parts. The wedge walls are preferably provided with the usual crank pin openings 28.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A piston including a body consisting of a pair of side wall segments diametrically opposed and having inside edge surfaces inclined on each segment towards the corresponding surfaces of the other segment, said body having wedge wall segments each fitted between a corresponding pair of said inclined surfaces and dovetailed thereto, said side wall segments having lugs thereon spaced from the lateral inner edge portions of the edge wall segments, wedges extending longitudinally of the piston between said lugs and lateral edge portions, and means to adjust said wedges longitudinally and thereby force the wedge wall segments apart whereby to spring the edge portions of the side wall segments outwardly.

2. A piston including a body consisting of a pair of side wall segments diametrically opposed and having inside edge surfaces inclined on each segment towards the corresponding surfaces of the other segment, said body having wedge wall segments each fitted between a corresponding pair of said inclined surfaces and dovetailed thereto, said side wall segments having lugs thereon spaced from the lateral inner edge portions of the wedge wall segments, wedges extending longitudinally of the piston between said lugs and lateral edge portions, and means to adjust said wedges longitudinally and thereby force the wedge wall segments apart whereby to spring the edge portions of the side wall segments outwardly, said means including springs to maintain the wedges in adjusted position under tension.

3. A piston including a body consisting of a pair of side wall segments diametrically opposed and having inside edge surfaces inclined on each segment towards the corresponding surfaces of the other segment, said body having wedge wall segments each fitted between a corresponding pair of said inclined surfaces and dovetailed thereto, said side wall segments having lugs thereon spaced from the lateral inner edge portions of the wedge wall segments, wedges extending longitudinally of the piston between said lugs and lateral edge portions, means to adjust said wedges longitudinally and thereby force the wedge wall segments apart whereby to spring the edge portions of the side wall segments outwardly, and an end closure for said body having said segments slidably connected thereto.

4. A piston including a body consisting of a pair of side wall segments diametrically opposed and having inside edge surfaces inclined on each segment towards the corresponding surfaces of the other segment, said body having wedge wall segments each fitted between a corresponding pair of said inclined surfaces and dovetailed thereto, said side wall segments having lugs thereon spaced from the lateral inner edge portions of the wedge wall segments, wedges extending longitudinally of the piston between said lugs and lateral edge portions, means to adjust said wedges longitudinally and thereby force the wedge wall segments apart whereby to spring the edge portions of the side wall segments outwardly, said means including springs to maintain the wedges in adjusted position under tension, and an end closure for said body having said segments slidably connected thereto.

5. A piston including a body consisting of a pair of side wall segments diametrically opposed and having inside edge surfaces inclined on each segment towards the corresponding surfaces of the other segment, said body having wedge wall segments each fitted between a corresponding pair of said inclined surfaces and dovetailed thereto, said side wall segments having lugs thereon spaced from the lateral inner edge portions of the wedge wall segments, wedges extending longitudinally of the piston between said lugs and lateral edge portions, means to adjust said wedges longitudinally and thereby force the wedge wall segments apart whereby to spring the edge portions of the side wall segments outwardly, said means including springs to maintain the wedges in adjusted position under tension, internal flanges on the head ends of said segments, a plate within the body engaging said flanges, a second plate resting on top of the flanges, and a bolt and nut connecting said plates.

In testimony whereof I affix my signature.

GEORGE W. BOOKSH.